United States Patent
Gazit et al.

(10) Patent No.: US 11,755,823 B2
(45) Date of Patent: *Sep. 12, 2023

(54) SYSTEMS AND METHODS FOR OBTAINING AN ELECTRONIC SIGNATURE VIA A WORD PROCESSING APPLICATION

(71) Applicant: DocuSign, Inc., San Francisco, CA (US)

(72) Inventors: Inbar Gazit, San Francisco, CA (US); Joe Cartano, San Francisco, CA (US); Jenson Yan, San Francisco, CA (US); Lahini Arunachalam, San Francisco, CA (US); Tamara Solorzano Tejada, San Francisco, CA (US)

(73) Assignee: DOCUSIGN, INC., San Francisco, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 17/334,976

(22) Filed: May 31, 2021

(65) Prior Publication Data

US 2021/0286938 A1   Sep. 16, 2021

Related U.S. Application Data

(63) Continuation of application No. 14/610,979, filed on Jan. 30, 2015, now Pat. No. 11,055,479.

(51) Int. Cl.
*G06F 40/166* (2020.01)
*G06F 40/169* (2020.01)
(Continued)

(52) U.S. Cl.
CPC .......... *G06F 40/169* (2020.01); *G06F 9/3017* (2013.01); *G06F 9/44526* (2013.01);
(Continued)

(58) Field of Classification Search
CPC .... G06F 9/44526; G06F 9/3017; G06F 40/10; G06F 16/93; G06F 16/986; G06Q 10/103
See application file for complete search history.

(56) References Cited

U.S. PATENT DOCUMENTS 7,568,101 B1 * 7/2009 Catorcini .............. H04L 9/3247
   713/176
2001/0002485 A1   5/2001 Bisbee et al.
(Continued)

FOREIGN PATENT DOCUMENTS

WO   WO 2016/122656 A1   8/2016

OTHER PUBLICATIONS

"Use HelloSign to Get Documents Signed Online" by Andrew Kunesh dated Mar. 31, 2014 , retrieved from https://computers.tutsplus.com/tutorials/use-hellosign-to-get-documents-signed-online--cms-20366 (Year: 2014).*

(Continued)

*Primary Examiner* — Sanchita Roy
(74) *Attorney, Agent, or Firm* — Shumaker & Sieffert, P.A.

(57) ABSTRACT

Techniques for obtaining electronic signatures via word processing applications are described. One approach utilizes a code module, also referred to as a "markup module," that executes within a word processing application and that facilitates the preparation of a document for electronic signature. A user can operate the word processing application together with the markup module in order to add signature tag markers to the document and to provide recipient information about intended signers, such as names and email addresses. Once the document has been prepared, the code module transmits the document (including the added signature tag markers) and the recipient information to a digital transaction service. The digital transaction service then manages the signing of the document, such as by (Continued)

notifying the recipient, receiving the recipient's signature and securely storing the signature in association with the document.

20 Claims, 16 Drawing Sheets

(51) Int. Cl.
| | | |
|---|---|---|
| *H04L 9/32* | (2006.01) | |
| *G06F 21/64* | (2013.01) | |
| *G06Q 20/38* | (2012.01) | |
| *G06F 9/445* | (2018.01) | |
| *G06F 9/30* | (2018.01) | |
| *G06Q 10/10* | (2023.01) | |
| *G06F 40/117* | (2020.01) | |
| *G06F 16/93* | (2019.01) | |
| *G06F 16/958* | (2019.01) | |

(52) U.S. Cl.
CPC ............ *G06F 21/64* (2013.01); *G06F 40/117* (2020.01); *G06F 40/166* (2020.01); *G06Q 10/103* (2013.01); *G06Q 20/3825* (2013.01); *H04L 9/32* (2013.01); *G06F 16/93* (2019.01); *G06F 16/986* (2019.01); *H04L 9/3247* (2013.01)

(56) References Cited

U.S. PATENT DOCUMENTS

| | | |
|---|---|---|
| 2004/0187003 A1 | 9/2004 | Philips |
| 2007/0079128 A1 | 4/2007 | Cheng et al. |
| 2008/0209313 A1* | 8/2008 | Gonser ................. G06F 40/186 715/255 |
| 2008/0235577 A1 | 9/2008 | Veluchamy et al. |
| 2009/0025087 A1 | 1/2009 | Peirson, Jr. et al. |
| 2010/0245294 A1 | 9/2010 | Piersol et al. |
| 2010/0306249 A1 | 12/2010 | Hill et al. |
| 2011/0025842 A1 | 2/2011 | King et al. |
| 2011/0145068 A1 | 6/2011 | King et al. |
| 2012/0303962 A1* | 11/2012 | Ghani ................. G06Q 20/3821 713/176 |
| 2013/0019156 A1* | 1/2013 | Gonser ................. G06F 40/174 715/221 |
| 2013/0275849 A1 | 10/2013 | King et al. |

OTHER PUBLICATIONS

International Application Serial No. PCT/US2015/013957, International Search Report dated Jan. 14, 2016, 2 pgs.

International Application Serial No. PCT/US2015/013957, Written Opinion dated Jan. 14, 2016, 4 pgs.

International Application Serial No. PCT/US2015/013957, International Preliminary Report on Patentability dated Aug. 10, 2017, 6 pgs.

Patent Trial and Appeal Board Decision, U.S. Appl. No. 14/610,979, Appeal 2019-004886, Feb. 17, 2021, 10 pages.

United States Office Action, U.S. Appl. No. 14/610,979, dated Mar. 22, 2018, 7 pages.

United States Office Action, U.S. Appl. No. 14/610,979, dated Aug. 25, 2017, 8 pages.

* cited by examiner

Word Processing Application Screen 300

File   Edit   View   Insert   Format   Tools

Vacation Request

I am requesting the following vacation days:

December 16, 2014 – December 31, 2014

Employee Name: [Name]   Manager Name: [Name]

Signed: [SIGN]   Signed: [SIGN]

Date: [Date]   Date: [Date]

Document 301

Add/Remove Tags

- Sign
- Initial
- Text
- Name
- Date

[Next]

Markup Module UI 302

Word Processing Application Screen 300

File   Edit   View   Insert   Format   Tools

Vacation Request

I am requesting the following vacation days:

December 16, 2014 – December 31, 2014

Employee Name:                    Manager Name:

Bob Smith                         | Name |

Signed:                           Signed:   | SIGN ▼ |

*Bob Smith*

Date:                             Date:

May 4, 2014                       | Date |

Document 301

---

Send Document

Your document is ready to send.

[ Send ]

Markup Module UI 302

*Fig. 3E*

Word Processing Application Screen 300

File  Edit  View  Insert  Format  Tools

---

Vacation Request

I am requesting the following vacation days:

December 16, 2014 – December 31, 2014

Employee Name:
Bob Smith  ⟵ 310a

Manager Name:
[ Name ]

Signed:
*Bob Smith*  ⟵ 310b

Signed:
[ SIGN ▼ ]

Date:
May 4, 2014  ⟵ 310c

Date:
[ Date ]

Document 301

---

Sign Document

Please sign the document at the tags on the left.

[ Next ]

Markup Module UI 302

*Fig. 3G*

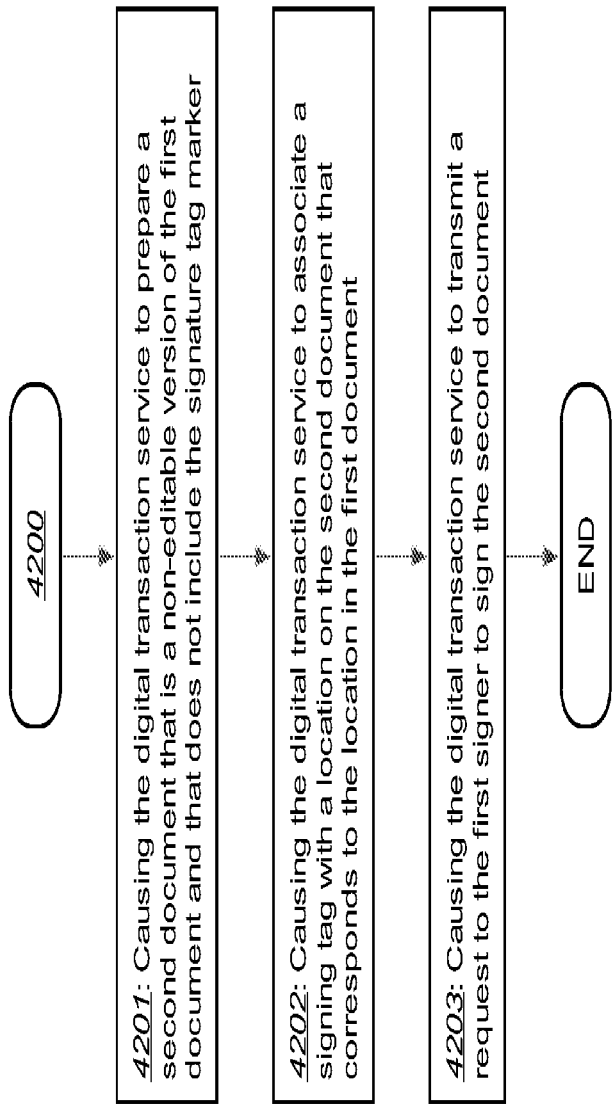

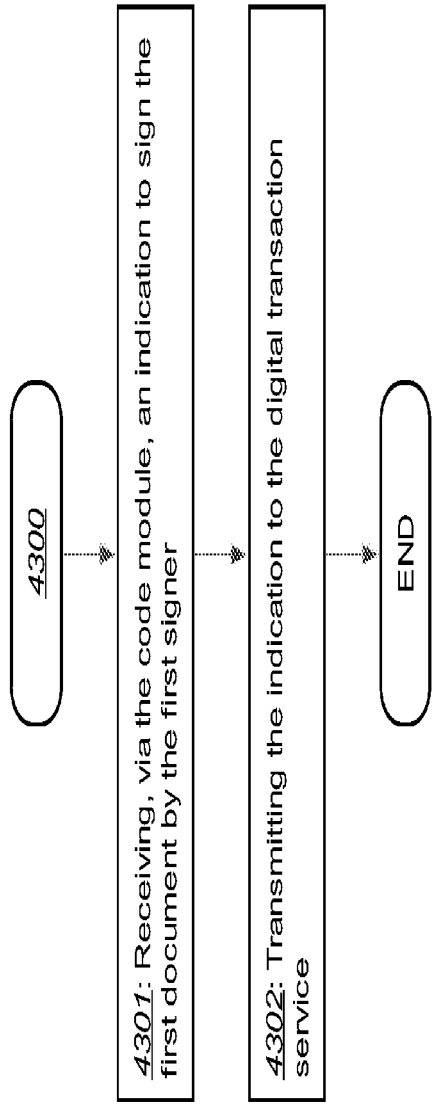

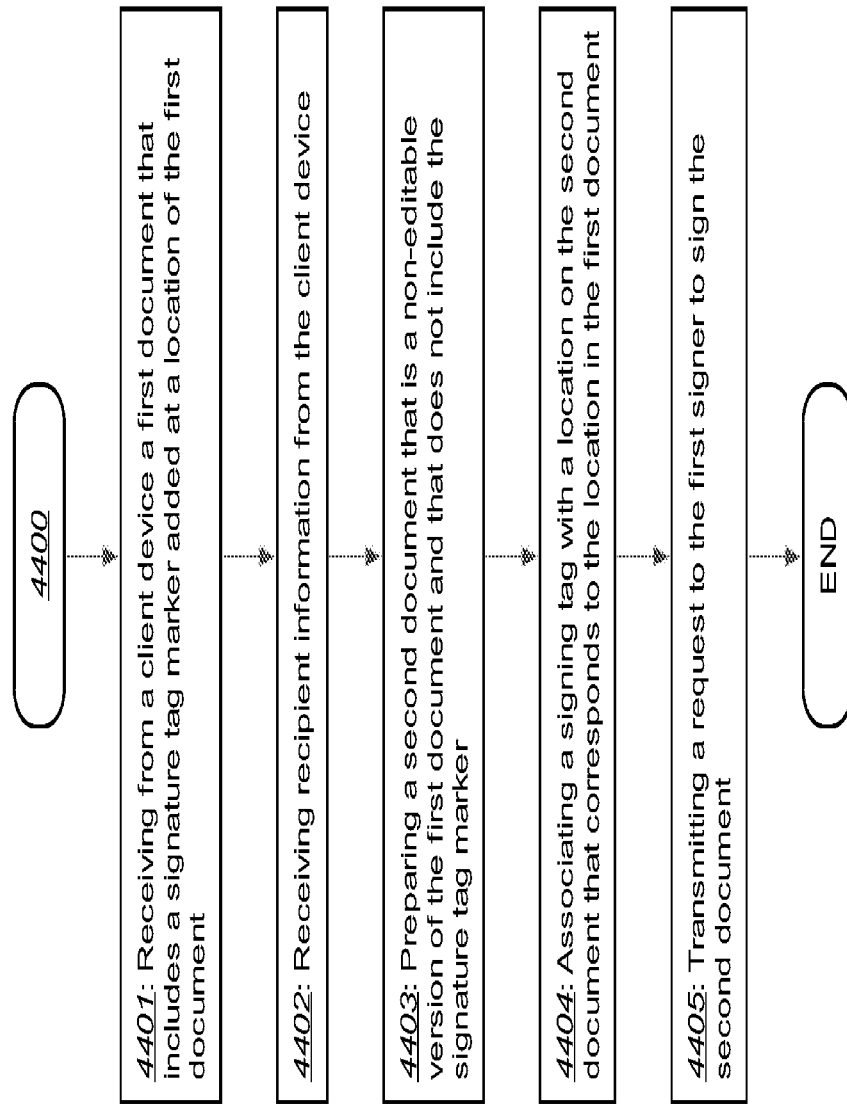

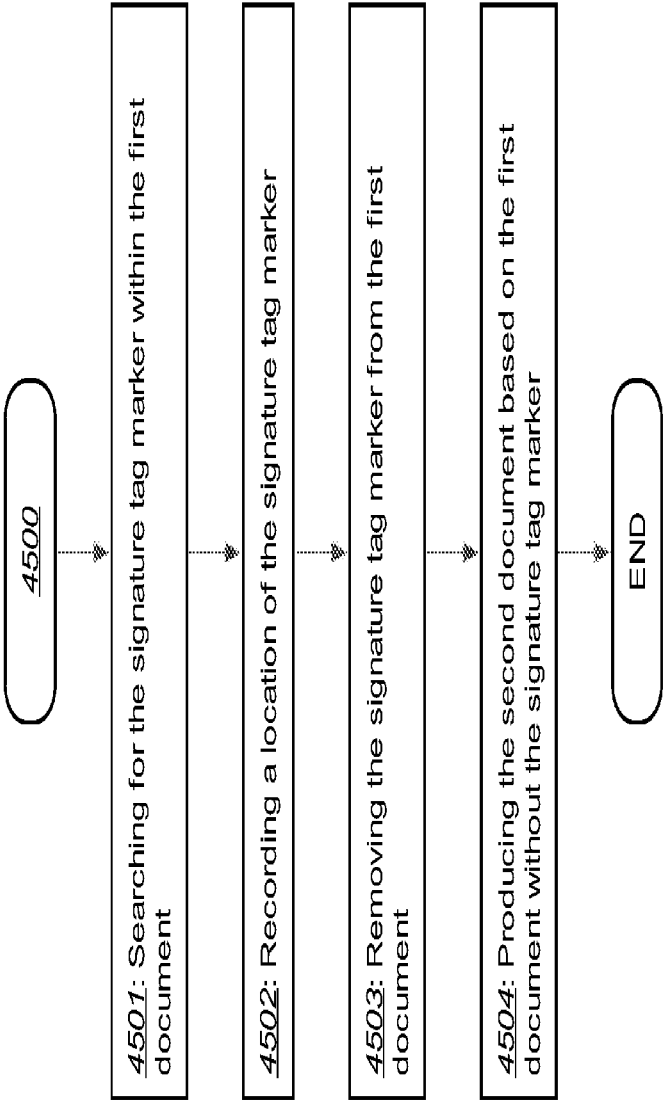

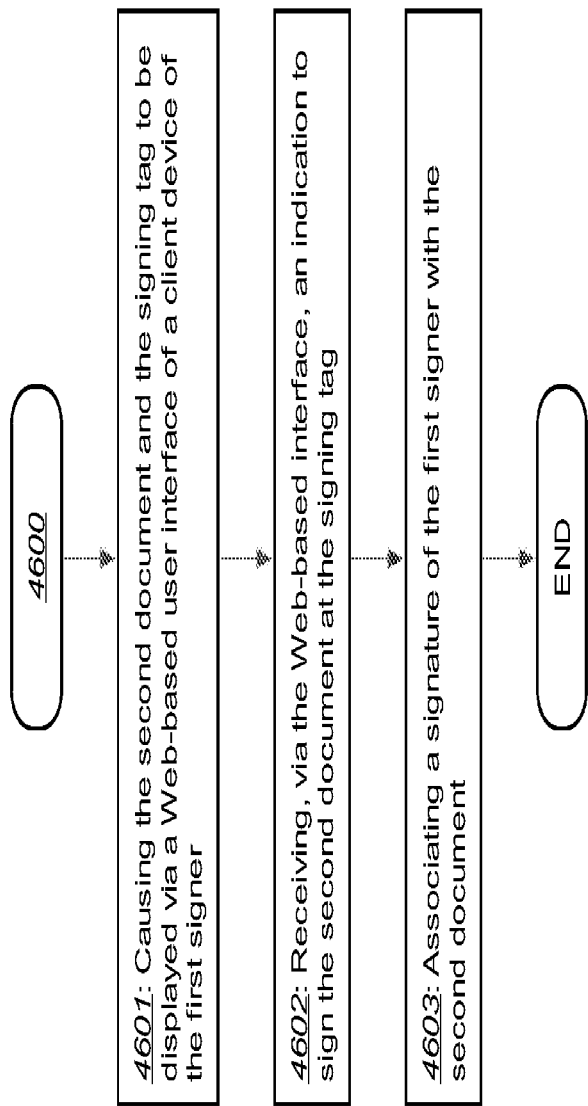

SYSTEMS AND METHODS FOR OBTAINING AN ELECTRONIC SIGNATURE VIA A WORD PROCESSING APPLICATION

This application is a continuation of U.S. application Ser. No. 14/610,979, filed Jan. 30, 2015, now U.S. Pat. No. 11,055,479, which is incorporated by reference in its entirety.

FIELD OF THE INVENTION

The present disclosure relates to systems and methods for obtaining electronic signatures via a word processing application.

BACKGROUND

Existing approaches to obtaining electronic signatures require multiple interactions with multiple distinct applications, services and/or systems. In a typical approach, a user first prepares a document for signature, such as by using a word processing application, such as Microsoft Word, OpenOffice, or the like. Next, the user uploads the document to an electronic signature service. Then the user interacts with the electronic signature service to specify the locations at which the document is to be signed, the types of data that are to be collected (e.g., signatures, dates, names), the identities of the signing party (e.g., name, email address), and the like. Once the document and related signature information is provided by the user, the signing party can interact with electronic signature service to provide their signature, which is then stored by the electronic signature service.

The above-described approach suffers from a number of drawbacks. First, the user must interact with two distinct applications in order to obtain the signature. The user initially prepares the document with a word processor and then must interact with the electronic signature service to set up and initiate a signing ceremony with respect to the document. Second, the document cannot be edited once it is uploaded to the electronic signature service. This means that if the user finds a typo, formatting issue, or other problem with the document once it is uploaded, the user must return to the word processing application, revise the document, and then upload the revised document, while removing the prior version of the document from the service. Also, if the user is himself a document signer, he typically cannot sign the document while he sets up the signing ceremony with the electronic signature service. Rather, the user must engage in a second, separate interaction with the service in order to apply his signature.

BRIEF DESCRIPTION OF THE DRAWINGS

Preferred and alternative examples of the present invention are described in detail below with reference to the following drawings:

FIGS. 3A-3G illustrate user interface screens provided by example embodiments;

FIGS. 4A-4F are flow diagrams of processes performed by example embodiments.

DETAILED DESCRIPTION

Embodiments described herein provide enhanced computer- and network-based systems and methods for obtaining electronic signatures via word processing applications. Example embodiments provide a code module, also referred to as a "markup module," that executes within a word processing application and that facilitates the preparation of a document for electronic signature. A user can operate the word processing application together with the markup module in order to add signature tag markers to the document and to provide recipient information about intended signers, such as names and email addresses. Once the document has been so prepared, the code module transmits the document (including the added signature tag markers) and the recipient information to a digital transaction service ("DTS"). The DTS then prepares a non-editable version of the document that does not include the signature tag markers. The DTS then manages the signing of the document, such as by notifying the recipient, receiving the recipient's signature and related signature data at locations corresponding to the locations of the signature tag markers, and securely storing the signature in association with the document.

The described techniques are applicable in a wide variety of contexts. In the following, the techniques are described above as being deployed with respect to a digital transaction service that provides an electronic signature service configured to manage the collection of electronic signatures with respect to documents such as agreements, contracts, purchase orders, and the like. Using the described techniques in conjunction with an electronic signature service is but one possible deployment scenario, and should not be interpreted as limiting. The described techniques can generally be used in conjunction with any digital transaction services, including electronic signature services, real estate transaction services, online purchasing systems, payroll systems, procurement systems, human resources systems (e.g., time tracking, billing systems), and the like.

System Overview

Figure 1:
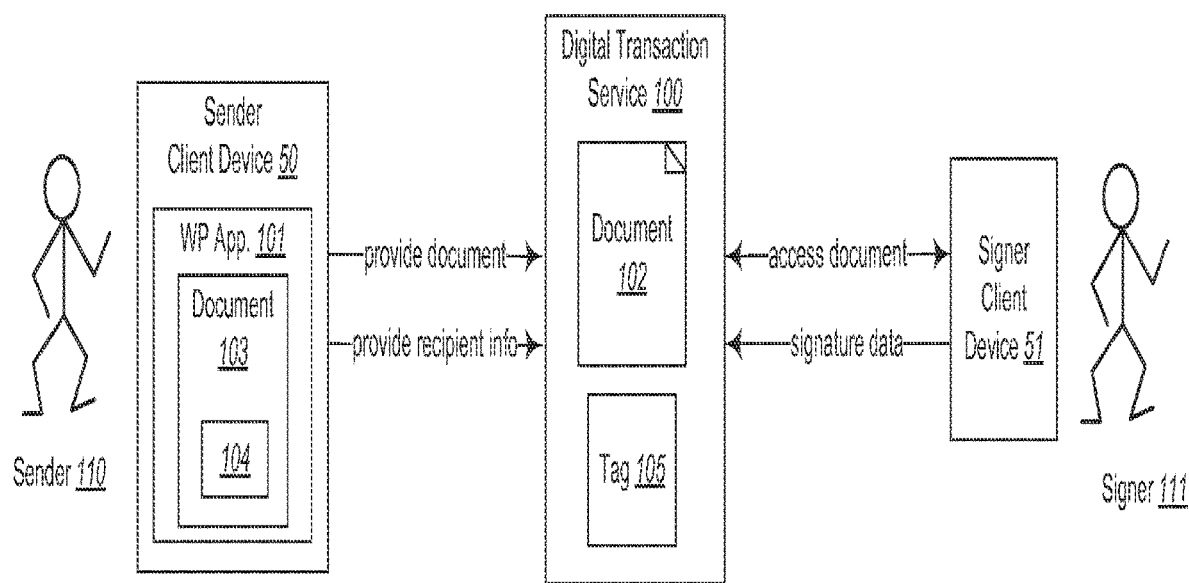
FIG. 1 is a block diagram of a user operating a word processing application to prepare a document for electronic signature via a digital transaction service according to an example embodiment.

FIG. 1 is a block diagram of a user operating a word processing application to prepare a document for electronic signature via a digital transaction service according to an example embodiment. FIG. 1 depicts a scenario in which a sender 110 obtains an electronic signature of a signer 111 by way of a Digital Transaction Service ("DTS") 100. The DTS 100 includes or provides access to an electronic signature service or facility.

In the scenario of FIG. 1, the sender 110 operates a word processing application 101 executing on a client device 50. The sender 110 uses the word processing application 101 in order to prepare, review and revise a document 103. As will be described in more detail below, the document is modified to include a signature tag marker 104 that identifies a location at which signature data (e.g., signature, name, date) is to be provided. The sender also specifies recipient information, such as a name and email address of the signer 111.

Once the sender 110 has prepared the document 103 to his satisfaction, the client device 50 provides the document 103 along with the specified recipient information to the DTS 100. Upon receiving the document 103, the DTS 100 prepares a second document 102. The document 102 is typically a non-editable version of the document 103, such as a PDF, TIFF, or similar representation. The document 103 typically does not include the signature tag marker 104.

Instead, the DTS 100 creates a signing tag 105 that corresponds to the signature marker 104 present in document 103. This signing tag 105 will be used by the DTS 100 to collect a signature or related signature data from the signer 111, as described below.

The DTS 100 then notifies the signer 111 that the document 102 is ready for signature, such as by sending an email containing a link that can be used to access the document 102. The signer 111 then accesses the document 102, such as by selecting the email link and interacting with the DTS 100 via a Web browser. When the document 102 is presented to the signer 111, the signing tag 105 (or a user interface control that represents the signing tag 105) is presented at a location in the document 102 that corresponds to the location of the signature tag marker 104 in the original document 103. The signer 111 operates client device 51 in order to access, review and sign the document.

Once the signer 111 has signed the document 102, the DTS 100 stores an indication of the signature in association with the document 102. The DTS 100 may then notify the sender 110 that the document has been signed, such as by transmitting an email containing a link that can be used to access the document 102.

Figure 2:
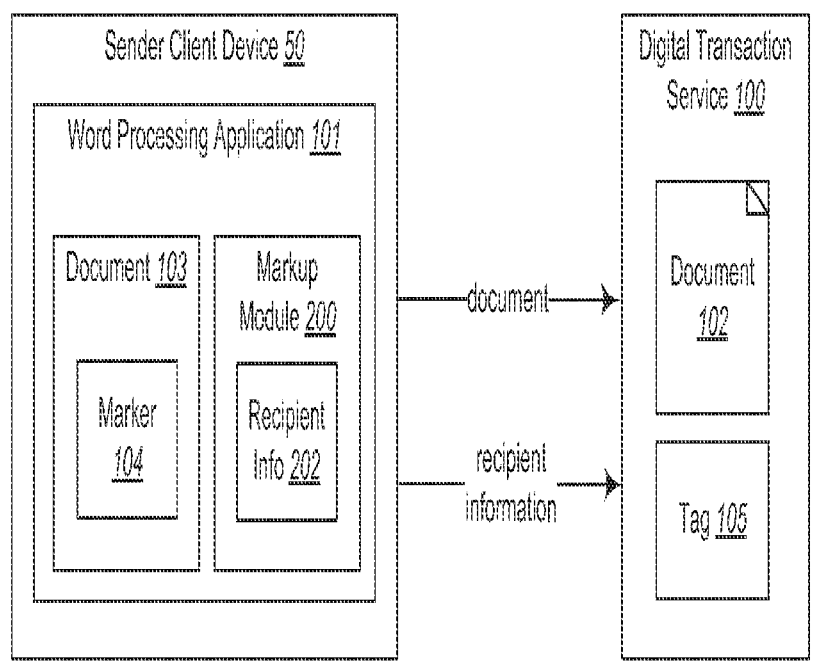
FIG. 2 is a block diagram of components of a word processing application configured according to an example embodiment.

FIG. 2 is a block diagram of components of a word processing application configured according to an example embodiment. FIG. 2 illustrates the client device 50 including the word processing application 101, document 10, and signature tag marker 104 described above. The signature tag marker may be any data item (e.g., an image, text string, text field, user interface control) that can be added at a location within document 103, manipulated via the word processing application 101, and distinguished from other elements (e.g., data and formatting) of the document 103. For example, the signature tag marker 104 may be an image that is situated at a particular location within the document 103, that has a unique identifier (e.g., name), and that identifies a type of signature data that is to be collected, such as a signature, name, or date.

The word processing application 101 includes a markup module 200. The markup module 200 is a code module that is executed by or within the word processing application 101. The markup module 200 includes instructions that perform the functions described herein. The markup module 200 may be implemented as a plug-in, adapter, dynamic library, or the like.

The markup module 200 may be executed in various ways. In some embodiments, the document 103 includes a reference (e.g., a link) to the markup module 200. When the document 103 is opened by the word processing application 101, the application 101 dynamically downloads (e.g., from the DTS or some third party) the module 200 and executes it. This approach provides the advantage that the user of the word processing application 101 need perform no installation or configuration operations to initiate execution of the module 200. In other embodiments, the user of the word processing application 101 downloads and installs the module 200. The module 200 may be implemented in various ways, including as a Web page that includes data and instructions that are configured to present a user interface and perform the other functions of the module 200.

The markup module 200 facilitates the preparation of the document 103 for electronic signature. For example, a user can operate the markup module 200 in order to provide recipient information, such as names and email addresses of signers. The markup module 200 can also be used to add signature tag markers (e.g., marker 104) that are configured for the collection of various types of signature data, such as dates, names, text, signatures, or the like. Adding a signature tag marker 104 may include dragging and dropping (or otherwise moving or inserting) a marker from a user interface of the markup module 200 into the document 103. The marker 104 can then be manipulated (e.g., resized, moved) by using functions of the word processing application 101.

Once the document 103 has been prepared to the satisfaction of the user, the markup module 200 transmits the document 103 and associated recipient information to the DTS 100. The DTS 100 then creates document 102 based on the received document 103. As noted, the document 102 is typically a non-editable, print-based representation of the document 103 that does not include the marker 104. For example, the document 102 may be a PDF document that is prepared by first removing the marker 104 from the document 103, and then converting the resulting document into a PDF document.

The DTS 100 also creates a signing tag 105. The tag 105 represents the type of signature data (e.g., name, date, signature) that is to be collected. The tag 105 also represents (or is associated with) the location in the document 102 at which it is to be displayed, such as the page number and/or the pixel coordinates at which marker 104 existed within document 103. When the document 102 is presented for signature, the tag 105, or a representation thereof, can then be displayed at the appropriate location.

Note that although the DTS 100 is here described as performing certain functions, such as removing the marker 104 from the document 103, such operations could be performed elsewhere in other embodiments. For example, some embodiments employ a third module, such as a document processing server that is distinct from the client device and the DTS 100. In such embodiments, the document processing server receives the marked up document from the module 200, removes signature tag markers, and then interacts with the DTS 100 in order to prepare the document 102, associate signing tag 105, and the like. The document processing server may invoke such functions via an application programming interface of the DTS 100 or similar mechanism. In other embodiments, the module 200 may itself remove signature tag markers (without reliance on an intermediary module or server) prior to transmitting the document 103 to the DTS 100.

FIGS. 3A-3G illustrate user interface screens provided by example embodiments. FIGS. 3A-3G illustrate a scenario in which a user operates a word processing application to prepare and transmit a document for electronic signature according to an example embodiment.

Figure 3A:
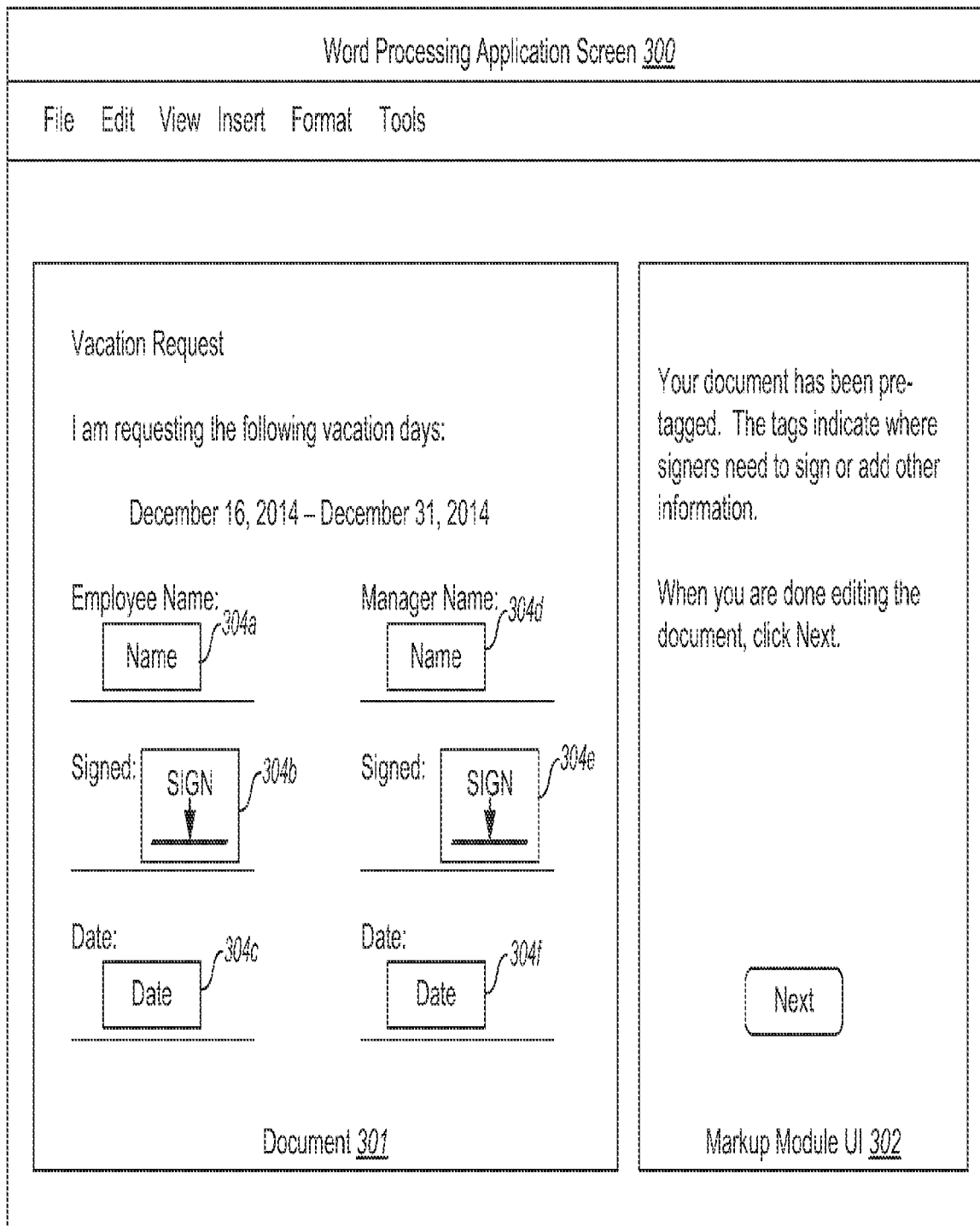

FIG. 3A shows a word processing application screen 300. The screen 300 may be provided by a conventional word processing application, such as Microsoft Word or OpenOffice. The screen 300 displays a document 301 and a markup module user interface 302. In the illustrated scenario, the document 301 is a vacation request form. The illustrated vacation request form requires two signatures: one from the employee and one from their manager. In the example of FIGS. 3A-3G, the user of the word processing application is also the employee who is requesting vacation time.

The document 301 has been previously prepared to include multiple signature tag markers 304a-304f. The markup module user interface 302 displays messages, instructions, controls and data input facilities. Here, the interface 302 notifies the user that the document has been previously tagged, such as by using the techniques described below. The markup module can determine that the document has been previously tagged because the document 301 has been modified to include an indication that it has been tagged. For example, a unique identifier or code may be stored in the document and/or associated with previously added signature tag markers, so that the markup module can detect that the document has been previously tagged. The interface includes a Next button, which when selected reconfigures the interface 302 to perform other functions, as described below.

FIG. 3B shows the markup module user interface 302 configured to facilitate the addition or removal of signature tag markers. In this configuration, the user can operate the user interface 302 in order to add additional signature tag markers (e.g., Sign, Initial, Text, Name, or Date) to the document 301. In addition, the user can move, remove and otherwise manipulate tags. For example, the user may add an Initial tag to the specified vacation dates, by selecting (e.g., clicking) the control labeled "Initial" from the user interface 302 and then selecting a location in the document 301 for its placement. Some embodiments may provide a "drag and drop" functionality. The result of such an operation is that an image labeled "Initial" is added to the document 301. As another example, because in this example the signature tag markers are represented as images, the user can resize one or more signature tag markers to better incorporate them into the document structure.

Figure 3C:
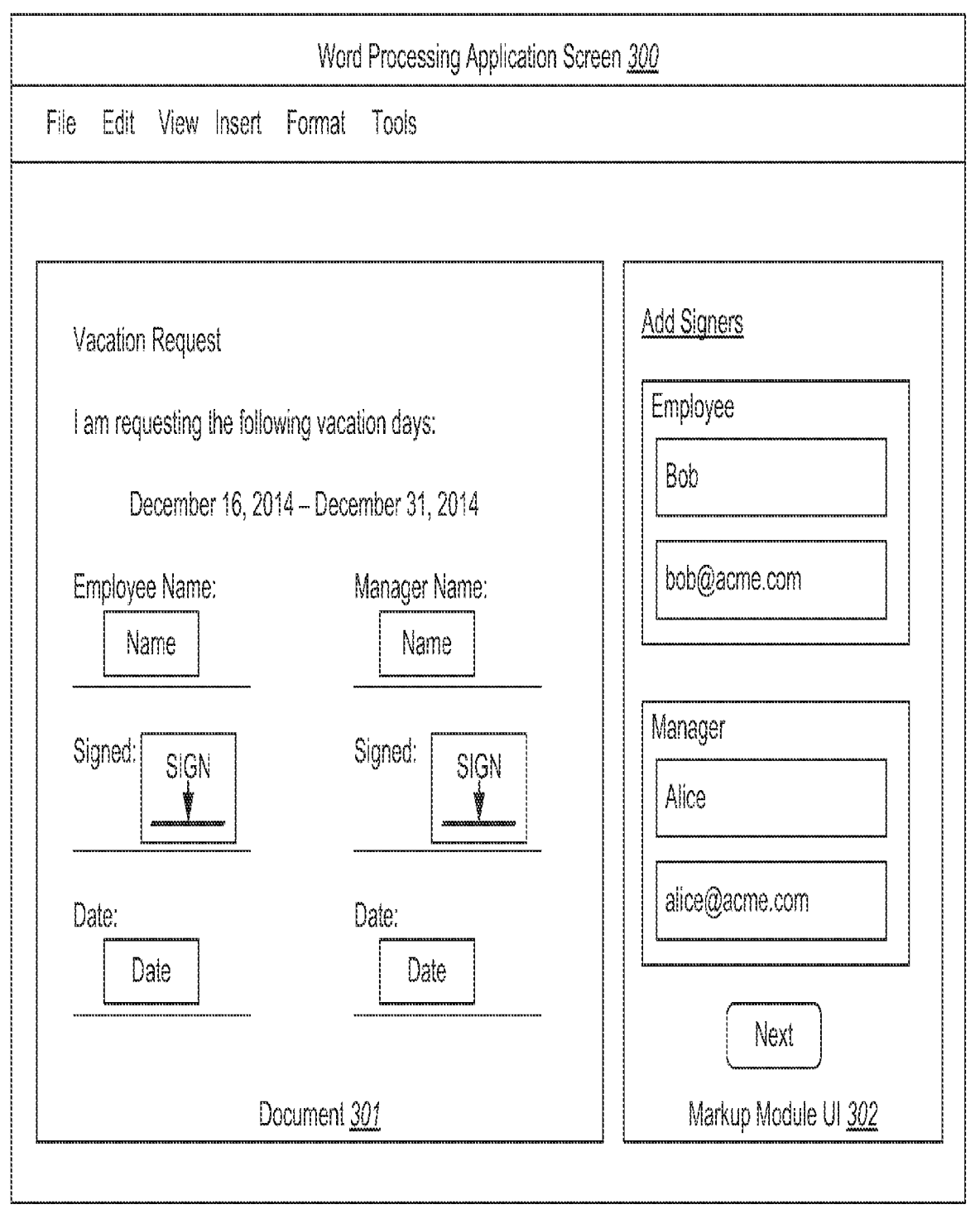

FIG. 3C shows the markup module user interface 302 configured to collect recipient information. In this configuration, the user operates the user interface 302 in order to provide the names and email addresses of the employee ("Bob") and manager ("Alice") signer.

Figure 3D:
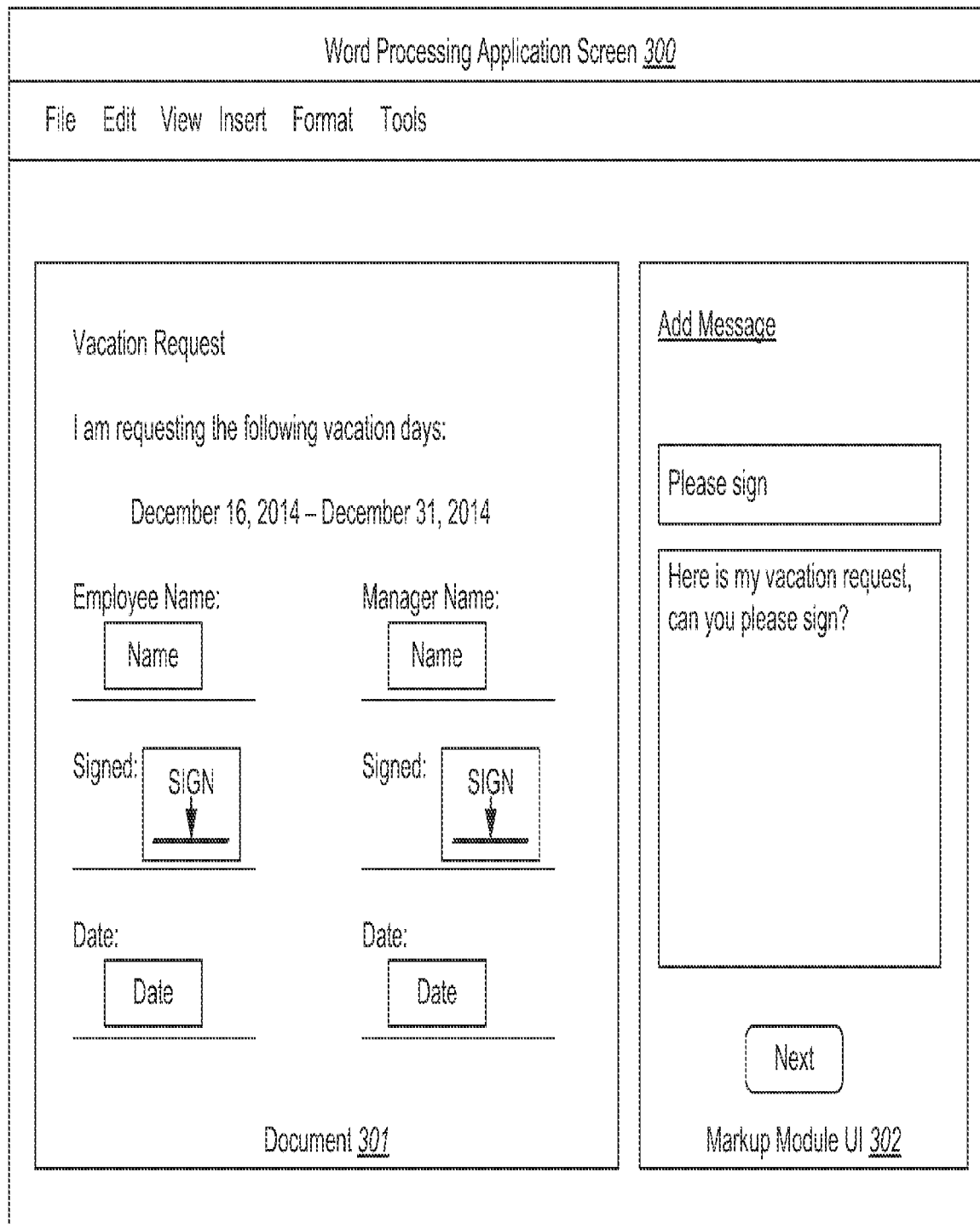

FIG. 3D shows the markup module user interface 302 configured to collect a message for the recipients. In this configuration, the user operates the user interface 302 in order to provide a message that will be incorporated into a notification email sent by the DTS to the recipients.

FIG. 3E shows the markup module user interface 302 configured to obtain an electronic signature via the digital transaction service. At this time, the document 301 is complete and ready to be transmitted to the DTS. When the user selects the Send button, the document 301 and related recipient information is transmitted to the DTS, where it is processed as described herein. The DTS further notifies recipients of the transaction and then engages in signing ceremonies with those recipients in order to obtain the signature data required by the document 301.

Figure 3F:
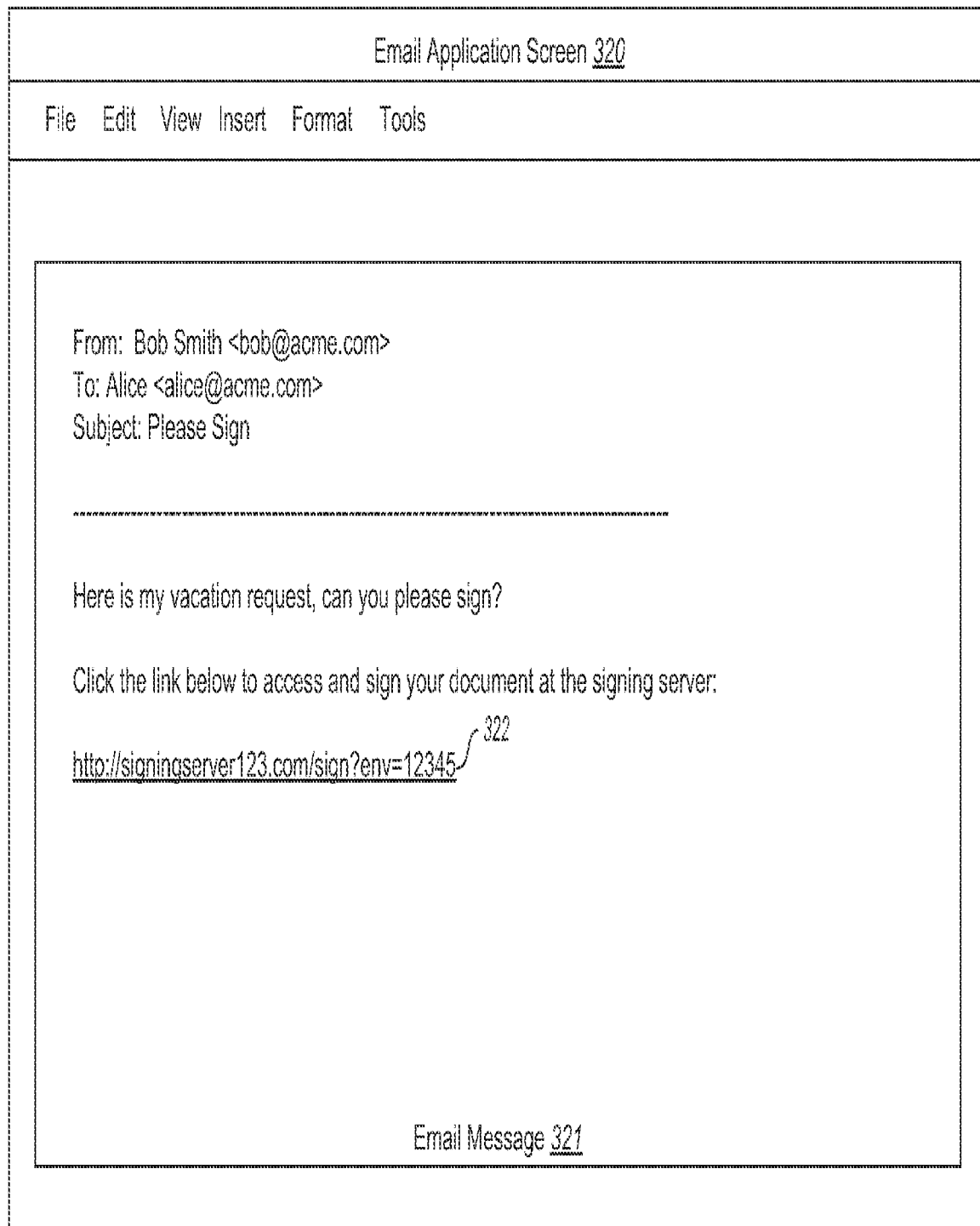

FIG. 3F shows an example email application screen 320. The email application screen 320 is displaying an email message 321 that invites the recipient to sign the document 301. In a typical embodiment, the DTS will transmit a similar email to each of the recipients specified as described with respect to FIG. 3C, above. To sign the document, recipient of the email message 321 clicks on an included link 322. This action invokes a Web browser or similarly enabled module in order to access the DTS 100, where the recipient can access, review, and sign the document. Other mechanisms for notifying recipients are contemplated, such as via other types of messaging services (e.g., SMS, MMS, chat), protocols, or clients (e.g., a mobile device app).

FIG. 3G shows the markup module user interface 302 configured to collect a signature from the user. The illustrated screen may be provided in some embodiments in the special case that the user of the word processing application is also one of the specified signers. In this example, because the user is also the specified employee signer, the user interface 302 provides the option to the user to sign the document 301. To sign the document 301, the markup module identifies signature tag markers that are linked to the user, and then requests that the user provide the required signature data for each one. In this example, signature tag markers 304a-304c (FIG. 3A) require signature data from the user, including respectively the signer's name, signer's signature and date signed. Once this information has been provided by the user, the markup module replaces the signature tag markers 304a-304c with representations 310a-310c of the provided signature data, to reflect the fact that the user has signed the document 301.

In other embodiments, the user may sign the document in other ways. For example, the user may provide the required signature data, which is then transmitted (separately from the document 301) to the DTS where it is incorporated into the document 301. As another example, some embodiments may not provide the option for the user to also sign the document, instead preferring to manage all signatures uniformly, via later interaction with the DTS.

Example Processes

FIGS. 4A-4F are flow diagrams of processes performed by example embodiments.

Figure 4A:
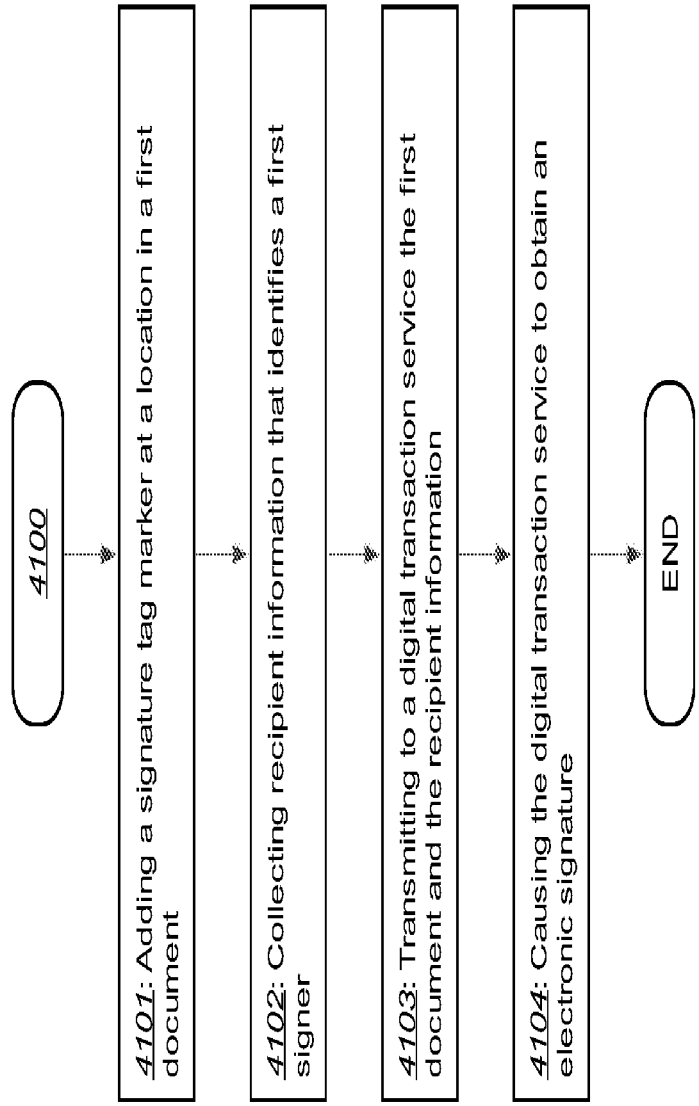

FIG. 4A is a flow diagram of example logic for obtaining an electronic signature via a client device. The illustrated logic in this and the following flow diagrams may be performed by the client device 50 executing the word processing application 101 and markup module 200, described with respect to FIGS. 1 and 2, above. More particularly, FIG. 4A illustrates a process 4100 that includes the following block(s).

Block 4101 includes in a word processing application executing on the client device, adding a signature tag marker at a location in a first document that is open in and editable by the word processing application. The signature tag marker may be an image, control (e.g., button, link), text tag, field, or the like. The signature tag marker directs a user to sign, initial, provide a name, provide a date, or provide other information at the specified location. The marker is typically added to the first document by a user of the word processing application, but can also or instead be added programmatically. The marker is added by being incorporated, using the editing facilities of the word processing application, into the first document data structure, as represented in memory, disk, or the like.

Block 4102 includes collecting recipient information that identifies a first signer via a code module that is provided by the digital transaction service and that is executed by the word processing application. Here the process receives, via the code module, recipient information, such as a name and email address from the user of the word processing application. The code module may be a plug-in, app, embedded object, or the like, that is executed by the word processing application so that it appears within the user interface provided by the word processing application. Typically, the code module is provided by the digital transaction service, such as via a download occurring when the first document is opened in response to a reference to the module within the first document. In other embodiments, the code module is provided by some third-party and configured to interact with the digital transaction service via a public API.

Block 4103 includes transmitting to a digital transaction service the first document and the recipient information from the client device. When the user of the word processing application has prepared the first document to his satisfaction, such as by manipulating, adding, or removing tags or recipient information, the code module transmits the first document and the recipient information to a remote digital transaction service. The information can be transmitted via an HTTP request or similar interaction.

Block 4104 includes causing the digital transaction service to obtain an electronic signature. In some embodiments, causing the digital transaction service to obtain an electronic signature includes preparing a second document that is non-editable and that does not include the signature tag marker, as described further below.

FIG. 4B is a flow diagram of example logic illustrating an extension of process 4100 of FIG. 4A. More particularly, FIG. 4B illustrates a process 4200 that includes the process 4100, wherein the causing the digital transaction service to obtain an electronic signature includes the following block(s). While at least some of following includes operations described as being performed by the digital transaction service, other embodiments may perform one or more of those operations elsewhere, such as in an intermediate processing server.

Block 4201 includes causing the digital transaction service to prepare a second document that is a non-editable version of the first document and that does not include the signature tag marker. The process causes the digital transaction service to prepare the second document by transmitting some indication (e.g., a command, an API call, the first document, the recipient information) to the digital transaction service that initiates preparation of the second document. The digital transaction service prepares the second document by converting the editable first document into a non-editable second document that is represented in PDF, TIFF, or similar. Before conversion, the digital transaction service removes the signature tag marker, such as by searching for the marker and removing it from the first document, while recording information about the location of the marker in memory or elsewhere.

Block 4202 includes causing the digital transaction service to associate a signing tag with a location on the second document that corresponds to the location in the first document. The process can cause the digital transaction service to associate the signing tag in various ways, such as by making an API call that specifies the type and location of a tag that is to be associated with the second document. The digital transaction service then creates a signing tag that has a location that corresponds to the location of the signature tag marker. The signature tag marker has a corresponding location in the first document, including page number and/or page location (e.g., x/y coordinates). This location is used to determine the location for the signing tag.

Block 4203 includes causing the digital transaction service to transmit a request to the first signer to sign the second document via the signing tag. The digital transaction service typically transmits an email to the first signer, the email including a link that can be used to access, review and sign the second document via a Web-based interface of the digital transaction service.

FIG. 4C is a flow diagram of example logic illustrating an extension of process 4100 of FIG. 4A. More particularly, FIG. 4C illustrates a process 4300 that includes the process 4100, and which further includes the following block(s).

Block 4301 includes receiving, via the code module, an indication to sign the first document by the first signer, wherein the first signer is a user of the word processing application. As noted above, in some embodiments, when the user of the word processing application is the first signer, the user can sign the document directly via the code module executing in the word processing application. By signing directly, the user need not perform the additional steps of visiting a Web-based (or other) interface of the digital transaction service in order to sign the document.

Block 4302 includes transmitting the indication to the digital transaction service, thereby causing the digital transaction service to associate a signature of the user with the second document. The indication to sign is typically transmitted to the digital transaction service along with the first document and the recipient information. The digital transaction service then prepares a second document as discussed herein, and associates the user's signature with that document. The digital transaction service need not transmit a request to sign to the first signer, as that person has already signed the document. However, the digital transaction service may still transmit a confirmation email or similar message to the first signer.

FIG. 4D is a flow diagram of example logic for obtaining an electronic signature. The illustrated logic in this and the following flow diagrams may be performed by the Digital Transaction Service 100, described with respect to FIGS. 1 and 2, above. More particularly, FIG. 4D illustrates a process 4400 that includes the following block(s).

Block 4401 includes receiving from a client device a first document that includes a signature tag marker added at a location of the first document by a word processing application executing on a client device. The process may receive the first document as part of an HTTP request made by the code module executing within the word processing application, discussed above.

Block 4402 includes receiving recipient information from the client device, wherein the recipient information identifies a first signer and is collected via a code module that is provided by the digital transaction service and that is executed by the word processing application. Typically, the recipient information is received as part of the same request or interaction used to receive the first document, although it could be received via a separate request.

Block 4403 includes preparing a second document that is a non-editable version of the first document and that does not include the signature tag marker. The process prepares the second document by converting the editable first document into a non-editable second document that is represented in PDF, TIFF, or similar. Before conversion, the digital transaction service removes the signature tag marker from the first document.

Block 4404 includes associating a signing tag with a location on the second document that corresponds to the location in the first document. Associating the signing tag can include storing information about the location of the signature tag marker, such as page number, page location (e.g., x/y location), or the like. This location information is referenced later when the second document is displayed for signature, so that a control or other user interface element can be presented for receiving the signature of the first signer.

Block 4405 includes transmitting a request to the first signer to sign the second document via the signing tag. The process typically transmits an email to the first signer, the email including a link that can be used to access, review and sign the second document via a Web-based interface of the digital transaction service. In other embodiments, the second document itself may be transmitted to the first signer. In such cases, the second document will include an embedded control that, when activated, invokes a signing ceremony that is performed locally or at the digital transaction service.

FIG. 4E is a flow diagram of example logic illustrating an extension of process 4400 of FIG. 4D. More particularly, FIG. 4E illustrates a process 4500 that includes the process 4400, wherein the associating a signing tag with a location on the second document that corresponds to the location in the first document includes the following block(s).

Block 4501 includes searching for the signature tag marker within the first document. The signature tag marker includes information that can be used by the process to find the marker within the first document. For example, when the signature tag marker is an image, that image may be named or otherwise identified as a signature tag marker.

Block 4502 includes recording a location of the signature tag marker. The signature tag marker has a corresponding location in the first document. This location may be represented by page number and/or page location (e.g., x/y coordinates). This location is recorded so that it can be used to determine where to present a corresponding signing tag when the second document is signed by the first signer. Typically, the two locations are the same, although in some cases, such as when scaling or paper sizes differ between the first and second document, the location in the first document may need to be scaled or translated based on the dimensions of the second document. Note that in some cases, the first document may not by itself represent the page and x/y location of the signature tag marker. For example, if the first document is represented in HTML, the signature tag marker may occur somewhere within the of HTML statements, but have no page or pixel location that is readily ascertainable until the document is printed. To determine a page-based location, the process may print the first document to a PDF file (or similar), and then process the resulting file to determine the page and x/y coordinates of the signature tag marker. Then, the resulting file can be processed to remove the signature tag marker, as discussed below.

Block 4503 includes removing the signature tag marker from the first document. Once the signature tag marker is located and its location recorded, the signature tag marker can be removed from the first document. Alternatively, the signature tag marker can be replaced by a similarly sized, invisible element (e.g., an invisible image) in the first document, so that the marker will not appear in the second document when it is prepared. Replacing the signature tag marker may be particularly effective in, for example, HTML or other documents that may not contain page layout information. In such cases, when location information is determined as described above, an invisible image (or similar) can operate as a placeholder so that the determined location information will be correct with respect to the second document.

Block 4504 includes producing the second document based on the first document without the signature tag marker, the second document representing contents of first document in a page description language. The process converts the first document into a non-editable representation that presents the document as it would appear when printed, such as PDF, TIFF, or the like. Because the signature tag marker has been removed, as discussed above, the signature tag marker will not appear in the second document.

FIG. 4F is a flow diagram of example logic illustrating an extension of process 4400 of FIG. 4D. More particularly, FIG. 4F illustrates a process 4600 that includes the process 4400, and which further includes the following block(s).

Block 4601 includes causing the second document and the signing tag to be displayed via a Web-based user interface of a client device of the first signer. The process here initiates a signing ceremony with the first signer, such as by transmitting HTML and related client-side code to a Web browser executing on the first signer's client device. The Web browser renders the received HTML and executes the client-side code (e.g., JavaScript) which enables the first signer to navigate, review and sign the second document.

Block 4602 includes receiving, via the Web-based interface, an indication to sign the second document at the signing tag. The signing tag appears as a user interface control in the first signer's Web browser. When (or after) the first signer clicks or otherwise selects the signing tag, the indication to sign the second document is transmitted to the process.

Block 4603 includes associating a signature of the first signer with the second document. Associating the signature typically includes securely storing a record that the first signer has signed the second document. The process may also create a third document that is based on the second document, and that also includes a representation of the signature of the first signer.

It should be understood that the embodiments described in the various flowcharts may be executed in parallel, in series, or a combination thereof, unless the context clearly dictates otherwise. Accordingly, one or more blocks or combinations of blocks in the various flowcharts may be performed concurrently with other blocks or combinations of blocks. Additionally, one or more blocks or combinations of blocks may be performed in a sequence that varies from the sequence illustrated in the flowcharts.

Further, the embodiments described herein and shown in the various flowcharts may be implemented as entirely hardware embodiments (e.g., special-purpose hardware), entirely software embodiments (e.g., processor-readable instructions), or a combination thereof. In some embodiments, software embodiments can include multiple processes or threads, launched statically or dynamically as needed, or the like.

The embodiments described herein and shown in the various flowcharts may be implemented by computer instructions (or processor-readable instructions). These computer instructions may be provided to one or more processors to produce a machine, such that execution of the instructions on the processor causes a series of operational steps to be performed to create a means for implementing the embodiments described herein and/or shown in the flowcharts. In some embodiments, these computer instructions may be stored on machine-readable storage media, such as processor-readable non-transitory storage media.

Example Computing System Implementation

Figure 5:
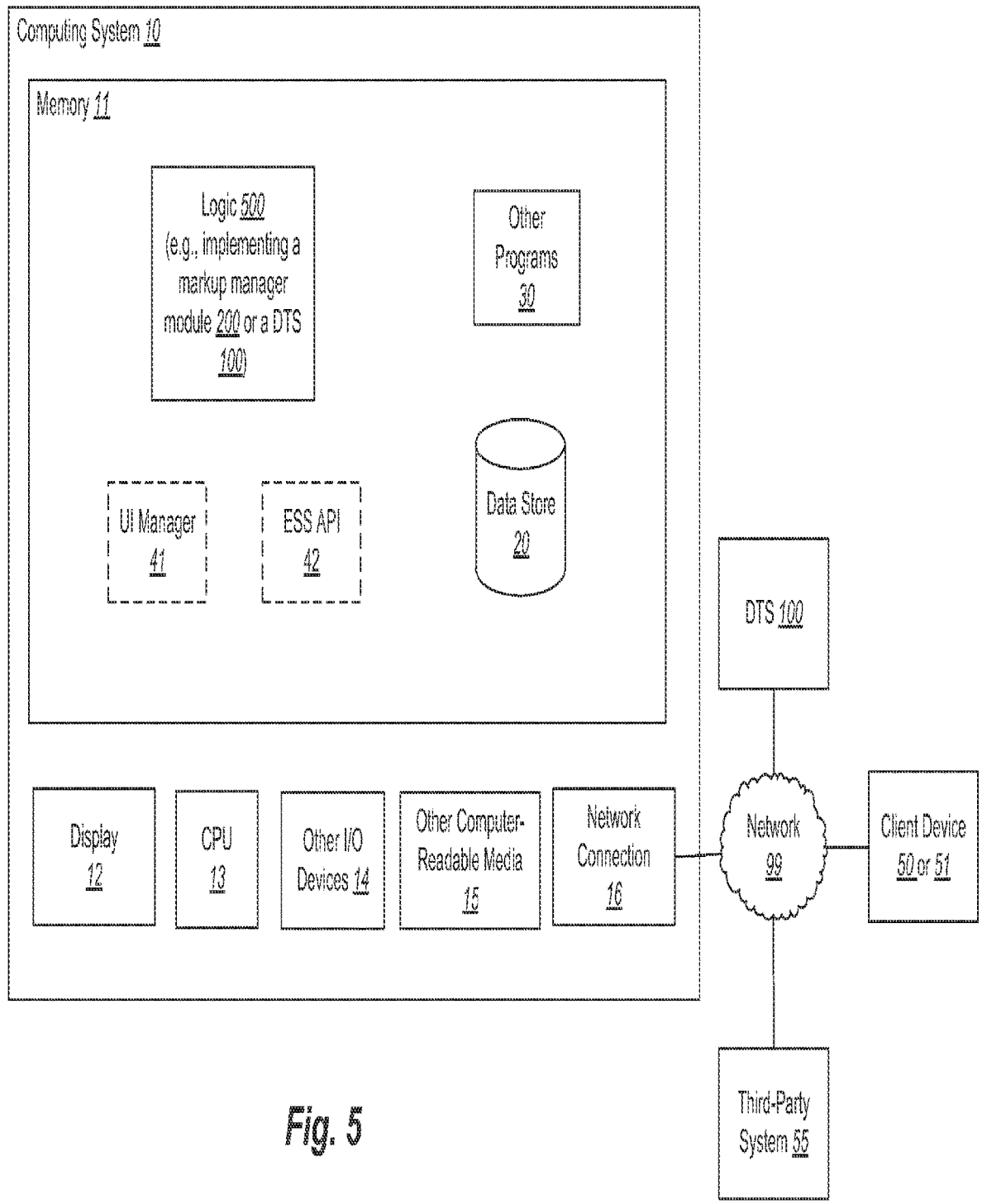
FIG. 5 is a block diagram of an example computing system for implementing example embodiments.

FIG. 5 is a block diagram of an example computing system for implementing example embodiments. In particular, FIG. 5 shows a computing system 10 that may be utilized to implement a markup manager module 200 and/or DTS 100.

Note that one or more general-purpose or special-purpose computing systems/devices may be used to implement the described techniques. In addition, the computing system 10 may comprise one or more distinct computing systems/devices and may span distributed locations. Furthermore, each block shown may represent one or more such blocks as appropriate to a specific embodiment or may be combined with other blocks. Also, the described techniques may be implemented in software, hardware, firmware, or in some combination to achieve the capabilities described herein.

In the embodiment shown, computing system 100 comprises a computer memory 11, a display 12, one or more Central Processing Units ("CPU") 13, input/output devices 14 (e.g., keyboard, mouse, LCD display, touch screen, and the like), other computer-readable media 15 and a network connection 16 connected to a network 99.

Logic 500 is shown residing in memory 11. The logic 500 implements the markup manager module 200 or the DTS 100. The components of the logic 500 preferably execute on one or more CPUs 13 and perform the processes described herein. Other code or programs 30 (e.g., an administrative interface, a Web server, and the like) and a data store 20, also reside in the memory 11, and preferably execute on one or more CPUs 13. Of note, one or more of the components in FIG. 5 may not be present in any specific implementation. For example, some embodiments may not provide other computer-readable media 15 or a display 12.

When the logic 500 implements the markup manager module 200, the logic 500 performs the client-side processes described herein. For example, the logic facilitates the addition, removal and manipulation of signature tag markers to documents; collects recipient information; transmits marked up documents and recipient information to the DTS 100; and causes the DTS 100 to collect the necessary electronic signatures.

When the logic 500 implements the DTS 100, the logic 500 may perform electronic signature-related functions for or on behalf of users operating client devices. In addition to providing access to and managing signature-related processes, the logic 500 may process documents in order to remove signature tag markers, prepare non-editable copies, and then obtain electronic signatures for those documents. The logic 500 securely stores the document securely in data store 20. Secure document storage may include using cryptographic techniques to detect document tampering, such as generating hashes, message digests, or the like.

The illustrated example logic 500 may also interact with a user interface ("UI") manager 41 and an application program interface ("API") 42. The UI manager 41 and API 42 are shown in dashed lines to indicate that in other embodiments they may be provided by other, possibly remote, computing systems. The UI manager 41 provides a view and a controller that facilitate user interaction with the logic 500 and its various components. For example, when the logic 500 implements the markup manager module 200, the UI manager may provide screens configured as shown in FIGS. 3A-3G. Alternatively, when the logic 500 implements the DTS 100, the UI manager 41 may provide interactive access to the logic 500, such that users can upload or download documents for signature, review and modify documents, transmit or otherwise provide signed documents to recipients, and the like. In some embodiments, access to the functionality of the UI manager 41 may be provided via a Web server, possibly executing as one of the other programs 30. In such embodiments, a user operating a Web browser (or other client) executing on one of the client devices 50 or 51 can interact with the logic 500 via the UI manager 41.

The API 42 provides programmatic access to one or more functions of the logic 500. For example, the API 42 may provide a programmatic interface to one or more functions of the logic 500 that may be invoked by one of the other programs 30 or some other module. In this manner, the API 42 facilitates the development of third-party software, such as user interfaces, plug-ins, news feeds, adapters (e.g., for integrating functions of the logic 500 into Web applications), and the like. In addition, the API 42 may be in at least some embodiments invoked or otherwise accessed via remote entities, such as the third-party system 55, to access various functions of the logic 500. For example, the markup manager module 200 may interact with the DTS 100 via such an API 42, in order to provide documents and recipient information.

The data store 20 is used by the other modules of the logic 500 to store and/or communicate information. The components of the logic 500 use the data store 20 to record various types of information, including recipient information, documents, signatures, tracked form entries, and the like. Although the components of the logic 500 are described as communicating primarily through the data store 20, other communication mechanisms are contemplated, including message passing, function calls, pipes, sockets, shared memory, and the like.

The logic 500 interacts via the network 99 with the DTS 100, client devices 50 and 51 and third-party systems 55. The network 99 may be any combination of one or more media (e.g., twisted pair, coaxial, fiber optic, radio frequency), hardware (e.g., routers, switches, repeaters, transceivers) and one or more protocols (e.g., TCP/IP, UDP, Ethernet, Wi-Fi, WiMAX) that facilitate communication between remotely situated humans and/or devices. In some embodiments, the network 99 may be or include multiple distinct communication channels or mechanisms (e.g., cable-based and wireless). The client devices 50 and 51 include personal computers, laptop computers, smart phones, personal digital assistants, tablet computers, kiosk systems, and the like. The third-party systems 55 and client devices 50 and 51 may be or include computing systems and/or devices constituted in a manner similar to that of computing system 100, and thus may also include displays, CPUs, other I/O devices (e.g., a camera), network connections, or the like.

In an example embodiment, components/modules of the logic 500 are implemented using standard programming techniques. For example, the logic 500 may be implemented as a "native" executable running on the CPU 13, along with one or more static or dynamic libraries. In other embodiments, the logic 500 may be implemented as instructions processed by a virtual machine that executes as one of the other programs 30. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like) and declarative (e.g., SQL, Prolog, and the like).

The data store 20 may be implemented as one or more database systems, file systems, or any other technique for storing such information, or any combination of the above, including implementations using distributed computing techniques. In addition, some embodiments may provide one or more interfaces to the data stored as part of the logic 500. Such interfaces may be provided via database connectivity APIs accessed from a variety of programming languages, Web-based interfaces, file systems interfaces, or the like.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in certain embodiments, some or all of the components of the logic 500 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored in a non-transitory manner on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A method comprising:
providing, by a central document system, a plug-in to a client device, the plug-in configured to enable a user to include a signature tag marker within an editable document displayed within a word processing application interface of a word processing application;
receiving, by the central document system, the editable document including the signature tag marker added at a location within the editable document;
generating, by the central document system, a second document that is a non-editable version of the editable document that does not include the signature tag marker;
identifying, by the central document system, a second location within the second document that corresponds to the location within the editable document; and
transmitting, by the central document system, a request to a signing entity to sign the second document at the second location.

2. The method of claim 1, wherein the plug-in causes the word processing application interface to present controls for providing signing entity information and for adding signature tag markers to the editable document.

3. The method of claim 2, wherein the word processing application is configured to transmit the document and the signing entity information to the central document system.

4. The method of claim 1, wherein the editable document references the plug-in and is configured to cause the word processing application to load the plug-in when the editable document is opened.

5. The method of claim 1, wherein the signature tag marker is an image embedded in the editable document by the word processor application, wherein the word processing application is configured to move and resize the image within the editable document.

6. The method of claim 1, wherein the signature tag marker is a button control embedded in the editable document by the word processor application, wherein the word processing application is configured to move and resize the button control within the editable document.

7. The method of claim 1, wherein the non-editable version of the editable document comprises a pdf version of the editable document.

8. A central document system comprising a hardware processor and a non-transitory computer-readable storage medium storing executable instructions that, when executed by the hardware processor, cause the hardware processor to perform steps comprising:
providing, by the central document system, a plug-in to a client device, the plug-in configured to enable a user to include a signature tag marker within an editable document displayed within a word processing application interface of a word processing application;
receiving, by the central document system, the editable document including the signature tag marker added at a location within the editable document;
generating, by the central document system, a second document that is a non-editable version of the editable document that does not include the signature tag marker;
identifying, by the central document system, a second location within the second document that corresponds to the location within the editable document; and
transmitting, by the central document system, a request to a signing entity to sign the second document at the second location.

9. The central document system of claim 8, wherein the plug-in causes the word processing application interface to present controls for providing signing entity information and for adding signature tag markers to the editable document.

10. The central document system of claim 9, wherein the word processing application is configured to transmit the document and the signing entity information to the central document system.

11. The central document system of claim 8, wherein the editable document references the plug-in and is configured to cause the word processing application to load the plug-in when the editable document is opened.

12. The central document system of claim 8, wherein the signature tag marker is an image embedded in the editable document by the word processor application, wherein the word processing application is configured to move and resize the image within the editable document.

13. The central document system of claim 8, wherein the signature tag marker is a button control embedded in the editable document by the word processor application, wherein the word processing application is configured to move and resize the button control within the editable document.

14. The central document system of claim 8, wherein the non-editable version of the editable document comprises a pdf version of the editable document.

15. A non-transitory computer-readable storage medium storing executable instructions that, when executed by a hardware processor of a central document system, cause the hardware processor to perform steps comprising:
- providing, by the central document system, a plug-in to a client device, the plug-in configured to enable a user to include a signature tag marker within an editable document displayed within a word processing application interface of a word processing application;
- receiving, by the central document system, the editable document including the signature tag marker added at a location within the editable document;
- generating, by the central document system, a second document that is a non-editable version of the editable document that does not include the signature tag marker;
- identifying, by the central document system, a second location within the second document that corresponds to the location within the editable document; and
- transmitting, by the central document system, a request to a signing entity to sign the second document at the second location.

16. The non-transitory computer-readable storage medium of claim 15, wherein the plug-in causes the word processing application interface to present controls for providing signing entity information and for adding signature tag markers to the editable document.

17. The non-transitory computer-readable storage medium of claim 16, wherein the word processing application is configured to transmit the document and the signing entity information to the central document system.

18. The non-transitory computer-readable storage medium of claim 15, wherein the editable document references the plug-in and is configured to cause the word processing application to load the plug-in when the editable document is opened.

19. The non-transitory computer-readable storage medium of claim 15, wherein the signature tag marker is an image embedded in the editable document by the word processor application, wherein the word processing application is configured to move and resize the image within the editable document.

20. The non-transitory computer-readable storage medium of claim 15, wherein the signature tag marker is a button control embedded in the editable document by the word processor application, wherein the word processing application is configured to move and resize the button control within the editable document.

* * * * *